United States Patent [19]

Tandon et al.

[11] Patent Number: 5,774,244

[45] Date of Patent: Jun. 30, 1998

[54] OPTICAL COMMUNICATIONS NETWORKS

[75] Inventors: Vivek Tandon, Woodbridge; Mark Wilby, London; Robert E. Semos, Sidcup, all of Great Britain

[73] Assignee: British Telecommunications public limited company, London, England

[21] Appl. No.: 676,257

[22] PCT Filed: Jan. 18, 1995

[86] PCT No.: PCT/GB95/00088

§ 371 Date: Nov. 26, 1996

§ 102(e) Date: Nov. 26, 1996

[87] PCT Pub. No.: WO95/19689

PCT Pub. Date: Jul. 20, 1995

Related U.S. Application Data

[63] Continuation-in-part of Ser. No. 204,571, Mar. 2, 1994.

[30] Foreign Application Priority Data

Jan. 18, 1994 [EP] European Pat. Off. ............... 94300347

[51] Int. Cl.⁶ .................................................. H04J 14/02
[52] U.S. Cl. .......................... 359/125; 359/119; 359/168; 370/424
[58] Field of Search ...................................... 359/119, 121, 359/125, 128, 168; 370/156, 424

[56] References Cited

U.S. PATENT DOCUMENTS

| 4,745,592 | 5/1988 | Gabriagues | 370/3 |
| 5,319,485 | 6/1994 | Yasui | 359/128 |
| 5,369,515 | 11/1994 | Majima | 359/125 |
| 5,455,699 | 10/1995 | Glance et al. | 359/125 |
| 5,576,875 | 11/1996 | Chawki et al. | 359/125 |

FOREIGN PATENT DOCUMENTS

| 0042934 | 2/1989 | Japan . | |
| 0126036 | 5/1989 | Japan . | |
| 0160298 | 6/1989 | Japan . | |
| 0192238 | 8/1989 | Japan . | |
| 2227623 | 8/1990 | United Kingdom | 359/121 |
| 9109478 | 6/1991 | WIPO . | |
| WO A9218890 | 10/1992 | WIPO . | |

OTHER PUBLICATIONS

Stern, "Linear Lightwave Networks: How Far Can They Go?", Conference Record, IEEE Global Telecommunications Conference, 2–5 Dec. 1990, vol. 3, pp. 1866–1872, San Diego.

Wagner et al, "Multiwavelength Ring Networks for Switch Consolidation and Interconnection", Conference Record, International Conference on Communications, 14–18 Jun. 1992, vol. 3, pp. 1173–1179, Chicago.

Hill, "A Wavelength Routing Approach to Optical Communications Networks", Proceedings, Seventh Annual Joint Conference of the IEEE Computer and Communication Societies, Infocom '88, 23–31 Mar. 1988, pp. 354–362.

Goodman et al, "The Lambdanet Multiwavelength Network: Architecture, Applications and Demonstrations", IEEE Journal on Selected Areas in Communication, vol. 8, No. 6, Aug. 1990, New York, pp. 995–1004.

(List continued on next page.)

Primary Examiner—Kinfe-Michael Negash
Attorney, Agent, or Firm—Nixon & Vanderhye P.C.

[57] ABSTRACT

An optical communications network includes a plurality of passive optical networks (PONs) connected in a ring in PON address order, in which communication channels between terminals are wavelength multiplexed. Each optical link between adjacent PONs includes a tunable wavelength filter, and a common wavelength allocation database is arranged dynamically to select wavelengths for a connection and to provide corresponding control signals to the appropriate filters such that the allocated wavelengths for a connection can pass over only the transmission path between the terminals. Thus the same wavelengths can be re-used for another connection whose transmission path does not overlap with any existing transmission path involving those wavelengths.

46 Claims, 5 Drawing Sheets

OTHER PUBLICATIONS

Alexander et al. "A Precompetitive Consortium on Wide–Band All–Optical Networks", Journal of Lightwave Technology, vol. 11, No. 5/6, May 1993, New York, pp. 714–732.

Stern, "Linear Lightwave Networks Performance Issues", Journal of Lightwave Technology, vol. 11, No. 5/6, May 1993, New York, pp. 937–950.

Bala et al, "Algorithms For Routing in a Linear Lightwave Network", IEEE Infocom '91.

Payne et al, "Wavelength Switched, Passively Coupled, Single Mode Optical Networks", Proc. ECOC/IOOC 85, Venice, 1985.

Sharony et al, "The Wavelength Dilation Concept—Implementation and System Considerations", ICC '92.

OPTICAL COMMUNICATIONS NETWORKS

RELATED APPLICATIONS

This application is a continuation-in-part of our earlier copending commonly assigned application Ser. No. 08/204,571 filed Mar. 2, 1994.

BACKGROUND OF THE INVENTION

1. Field of the Invention

This invention relates to wavelength management in an optical communications network employing wavelength division multiplexing.

2. Related Art

The efficient use of wavelengths in a wavelength division multiplexed communication system has been addressed by others. For example, U.S. Pat. No. 5,319,485—Yasui et al uses a wavelength control unit to monitor communication paths and, in response to a connection request signal, to select an optical signal wavelength to be used from among currently unused wavelengths on the communication paths. Other prior art considered pertinent by the Examiner includes:

U.S. Pat. No. 5,369,515—Majima
U.S. Pat. No. 4,745,592—Gabriagues
Japanese Appln. No. 0,042,934—Shibata
Japanese Appln. No. 0,192,238—Chikana
Japanese Appln. No. 9,109,478—Pratt
Japanese Appln. No. 0,160,298—Sakida
Japanese Appln. No. 0,126,036—Imoto It is known from "A Precompetitive Consortium on Wide-Band All-Optical Networks", by S B Alexander et al., Journal of Lightwave Technology, Vol. 11, No. 5/6, May 1993, to configure an all-optical network (AON) as a hierarchical tree structure in which a plurality of level-0 AONs, having optical terminals and also known as passive optical networks (PONs), are connected to level-1 AONs which in turn are connected to level-2 AONs. Each PON has a fixed frequency-selective local bypass for wavelengths which are pre-allocated for use at level-0, thus enabling the same wavelengths to be used by each PON. To connect with a terminal on a different PON, a terminal must use a wavelength not in the level-0 set to reach its associated level-1 AON where the wavelength is routed either to a PON on that level-1 AON or upwards to an associated level-2 AON to reach a PON on a different level-1 AON. Frequency changers may be used in this latter case.

International Application No. PCT/US92/03251 (International Publication No. WO 92/18890) discloses an optical network of nodes and connecting links of pairs of fibres carrying optical signals in opposite directions. Each node comprises an optical switch in the form of a controllable linear divider-combiner (LDC) assembly which under the control of a Network Control Centre performs power dividing and combining for each of the wavebands from a waveband demultiplexer to route signals from an input port to an output port.

The articles "Linear Lightwave Networks: Performance Issues" by T E Stern et al., Journal of Lightwave Technology, Vol. 11, No. 5/6, May/June 1993, and "Linear Lightwave Networks: How Far Can They Go?", by T E Stern, Conference Record, IEEE Global Telecommunications Conference, 2–5 Dec. 1990, Vol 3, pages 1866–1872, also disclose optical nodes employing an LOC as an optical switch performing controllable waveband selective optical signal routing, combining, and splitting. The switch proper comprises controllable power dividers (also known as directional couplers) disposed so that each input port can be controllably connected to any output port. In preferred arrangements there are several switches, each having its input ports connected to the output of a common waveband demultiplexer and its output ports connected to a common waveband multiplexer. In this way, wavelengths in a waveband can be confined to limited regions of a large network, and the waveband can be reused in other parts of the network.

The article "The LAMBDANET Multiwavelength Network: Architecture, Applications, and Demonstrations", by M S Goodman, et al., IEEE Journal on Selected Areas in Communications, Vol. 8, No. 6, August 1990, discloses a plurality of nodes, each of which transmits on a respective wavelength, connected to a star coupler so that each node output is broadcast to each other node. In order to separate the received set of wavelengths a node may use wavelength tunable filters and receivers, or multiple fixed receivers.

The paper "Multiwavelength Ring Networks for Switch Consolidation and Interconnection", by S S Wagner et al., Conference Record, International Conference on Communications, 14–18 Jun. 1992, Vol. 3, pages 1173–1179, discloses a plurality of Central Offices (COs) connected by a 2-fibre multiwavelength-ring network. One CO acts as a switch, and each of the other COs sends transmissions to the switching CO on a respective wavelength on both fibres (one clockwise and the other anti-clockwise for protection in case the ring were to be broken). The switching CO receives all wavelengths from the other COs, and retransmits on the corresponding wavelength to the appropriate destination CO, which extracts the incoming message on its associated wavelength and injects an outgoing message on the same wavelength using a dedicated optical add-drop filter. In a variant using an inner pair of fibres for transmission to the Switching CO and an outer pair of fibres for reception from the Switching CO, wavelengths can be pre-allocated for direct connections between COs (i.e. not passing through the switch), these wavelengths being directly coupled at the switching CO from the inner fibres to the outer fibres.

SUMMARY OF THE INVENTION

According to a first aspect of the present invention there is provided an optical communications network comprising: a plurality of connected passive optical networks (PONs) in which communication channels between terminals are wavelength multiplexed, at least some of the PONs being arranged to relay an optical signal on an incoming link to each of a plurality of outgoing links; and connection control means for dynamically allocating a first wavelength for a connection from a first terminal connected to a first PON to a second terminal connected to said first PON or to a different PON, and for dynamically controlling respective tunable wavelength filter means on links associated with the PON or PONs having the first and second terminals, and with any intermediate PONs, to block said dynamically allocated wavelength on any such associated link not being a link which is part of the transmission path from the first terminal to the second terminal.

Networks in accordance with the present invention contrast with those of the abovementioned prior art in that they do not employ an optical switch, but have a coupling arrangement for broadcasting each incoming optical signal to each outgoing fibre link and use tunable wavelength filters to block outgoing transmissions from a PON to its neighbouring PONs instead of the prior art arrangement of filters disposed at the receiving node to select the required wavelength from a set of incoming wavelengths. In this way, by appropriate control of the filters, a wavelength can be blocked on certain outgoing links and allowed to pass on a desired link or links whereby only the intended destination PON, or an intermediate PON, receives the transmitted wavelength, and since the wavelength is confined to the PONs and links associated with that connection it can be dynamically re-allocated for use with any other connection which does not involve a common PON. Such a network provides a network controller considerable scope in the establishment of transmission paths for connections and in the selection (including re-use) of the transmission wavelength(s).

In a first preferred network of the first aspect, the connection control means is arranged dynamically to allocate, for said first connection, a second wavelength for transmission from the second terminal to the first terminal, and dynamically to control said respective tunable wavelength filter means on links associated with the PON or PONs having the first and second terminals, and with any intermediate PONs, to block said second dynamically allocated wavelength on any such associated link not being a link which is part of the transmission path from the second terminal to the first terminal.

In a second preferred network of the first aspect, the PONs are linked serially in address order, each having an outgoing link to each neighbouring PON, the respective tunable filter means associated with links in the direction of increasing PON address order being arranged to block permanently wavelengths allocated, in use, by the connection control means to terminals for transmission to PONs of lower address, the respective tunable filter means associated with links in the direction of decreasing PON address being arranged to block permanently wavelengths allocated to terminals for transmission to PONs of higher address whereby, in use, only the tunable filter means associated with the outgoing links of the respective destination PONs to neighbouring PONs not associated with that connection are controlled to block the respective wavelength.

In such a second preferred network, preferably the connection control means is arranged to allocate for transmission in one direction wavelengths which are spaced and alternate with wavelengths which can be allocated for transmission in the other direction.

Alternatively, the connection control means is arranged to allocate for transmission in one direction wavelengths within a first band, and to allocate for transmission in the opposite direction wavelengths within a second band.

Preferably, the connection control means is arranged to allocate for each connection a pair of wavelengths, each pair being spaced by a constant amount.

According to a second aspect of the present invention there is provided a method of establishing communication between terminals on an optical communications network comprising a plurality of optically linked passive optical networks (PONs) in which communication channels between terminals are wavelength multiplexed and at least some of the PONs being arranged to relay an incoming optical signal to each of a plurality of outgoing links, the method comprising the steps of dynamically allocating a first wavelength for transmission from a source terminal to a destination terminal for a first connection, and dynamically controlling respective tunable wavelength filter means on links associated with the PON or PONs having the source and destination terminals, and with any intermediate PONs, to block said allocated wavelength such that the transmission is confined to the transmission path between the source and destination terminals, thereby enabling said allocated wavelength to be used for a simultaneous connection over a non-overlapping transmission path.

Preferably, there is included the step of dynamically allocating, for said first connection, a second wavelength for transmission from the destination terminal to the source terminal, and dynamically controlling said respective tunable wavelength filter means on links associated with the PON or PONs having the source and destination terminals, and with any intermediate PONs, to block said second allocated wavelength such that the transmission from the destination terminal is confined to the transmission path between the source and destination terminals.

Preferably, the PONs are linked serially in address order, and including permanently blocking one wavelength of said first and second allocated wavelengths on each link leading from at PON To a PON of lower address, permanently blocking the other wavelength of said allocated wavelengths on each link leading from a PON to a PON of higher address, selectively blocking the said one wavelength on the link leading from the destination PON to a PON of higher address, and selectively blocking said other wavelength an the link leading from the source PON to a PON of lower address.

There may be included the step of dynamically allocating each further connection having a transmission path overlapping that of the first connection a respective different pair of transmission wavelengths. The lower wavelengths of the pairs may be spaced apart by a predetermined difference, the upper wavelengths being spread apart by the same difference.

Preferably, each pair comprises adjacent wavelengths.

All the lower wavelengths of the pairs may be grouped in one group in wavelength order, the upper wavelengths being grouped in an adjacent group.

BRIEF DESCRIPTION OF THE DRAWINGS

Embodiments of communications networks in accordance with the present invention will now be described by way of example with reference to the drawings in which.

DETAILED DESCRIPTION OF EXEMPLARY EMBODIMENTS

Figure 1:
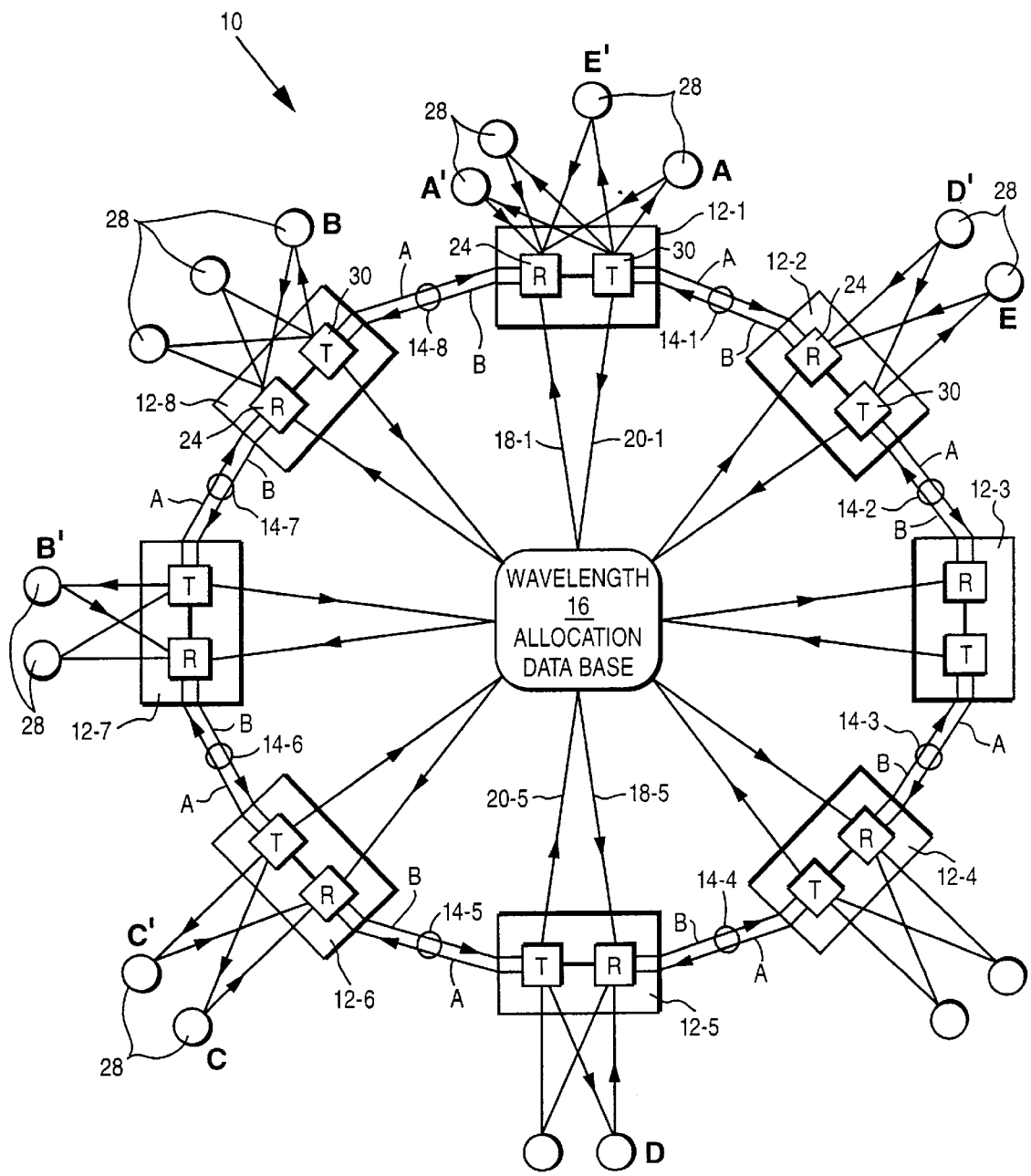
FIG. 1 is a schematic diagram of a communications network.

In FIG. 1 a communications network 10 in accordance with the present invention comprises thirty one passive optical networks (PONs), but for convenience only eight PONs 12-1 to 12-8 are shown coupled together in the form of a ring by pairs of optical links 14-1 to 14-8. One link A of pair 14-1 carries signals from PON 12-1 to PON 12-2, i.e. is an outgoing link with respect to PON 12-1, and the other link B of pair 14-1 carries signals in the opposite direction, i.e. is an outgoing link with respect to PON 12-2, and correspondingly for the other pairs 14-2 to 14-8.

Network 10 constitutes a local access network for a public communications network, equivalent to that known as a local exchange and its local exchange lines, and in this context terminals 28 are constituted by telephones and other such telecommunications apparatus, and, connections between terminals are generally referred to as calls.

Figure 2:
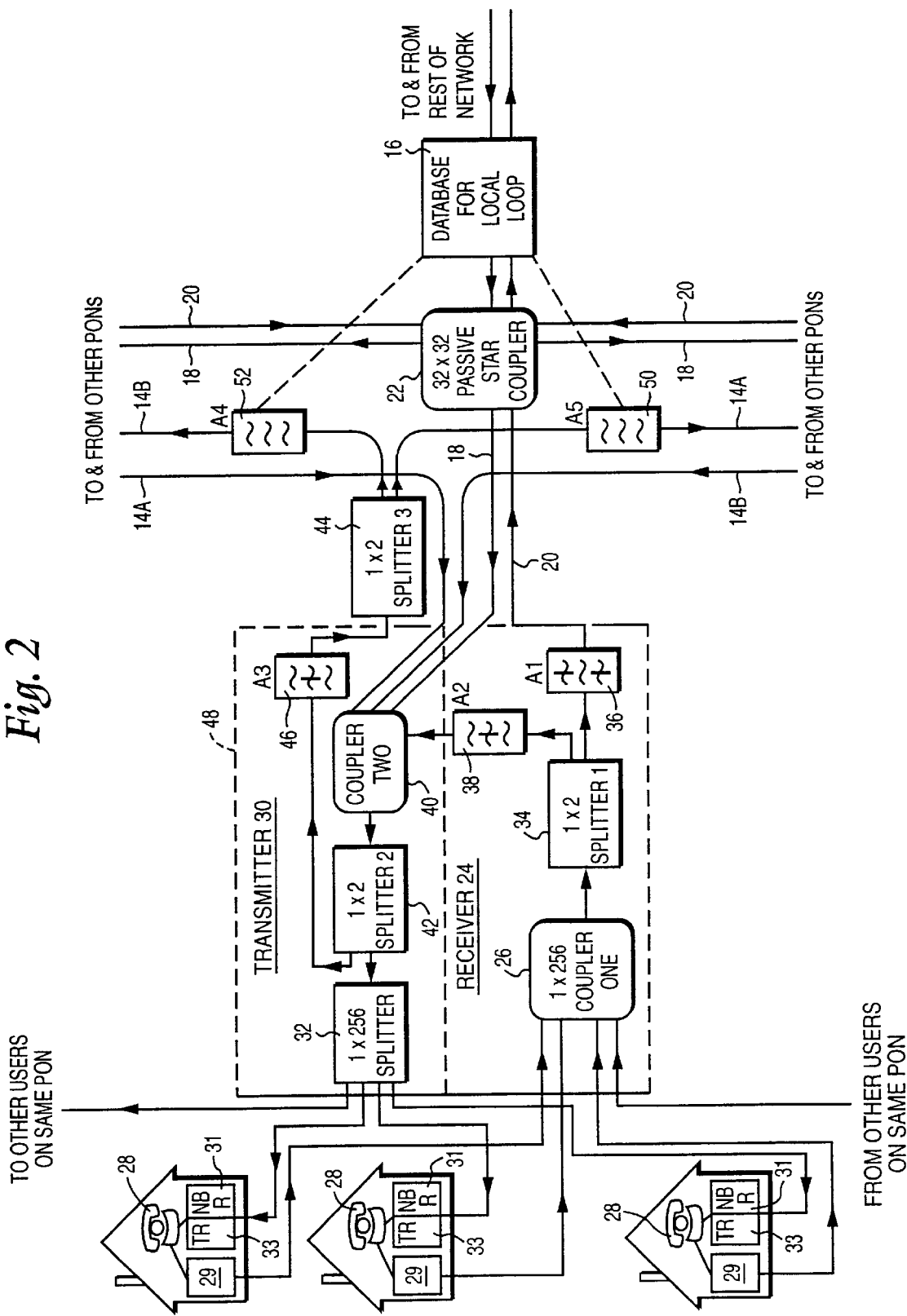
FIG. 2 is a schematic diagram of the component parts of a PON forming part of the network of FIG. 1.

Centrally disposed within the ring of PONs is a wavelength allocation database 16, and each PON communicates with the database 16 via an upstream link 18-1 to 18-8 and a downstream link 20-1 to 20-8, and a passive star coupler 22 (FIG. 2).

Within the head-end of each PON 12 is an optical receiving means (R) 24 comprising a 1×256 coupler 26 (FIG. 2) receiving upstream optical transmissions from all its terminals 28, and an optical transmitting means (T) 30 comprising a 1×256 splitter 32 (FIG. 2) feeding an optical signal to the downstream links to its terminals 28. The receiving means 24 provides an output to the downstream link 20 and to the transmitting means 30 which itself receives an input from the upstream link 18 and provides outputs to appropriate links to the neighbouring PONs.

The PON 12 is normally fully-loaded with 250 terminals 28, leaving six of the inputs and outputs spare.

Referring now to FIG. 2, which shows the component parts of a PON suitable for use in the network 10, the output of coupler 26 feeds a 1×2 splitter 34 one output of which is coupled to an input of the star coupler 22 via a wavelength filter or absorber 36 and link 20, and the other output is coupled to a wavelength filter or absorber 38. Filter 38 is designed to pass all wavelengths except a first predetermined wavelength $\lambda_1$, and filter 30 is designed to pass only the first predetermined wavelength, $\lambda_1$.

The output of filter 38 feeds into an input of a 1×4 coupler 40 whose output feeds the input of a 1×2 splitter 42. One output of splitter 42 feeds the input of the splitter 32, and the other output of splitter 42 is coupled to the input of a 1×2 splitter 44 via a wavelength filter or absorber 46 which is designed to pass all wavelengths except $\lambda_1$ and a second predetermined wavelength, $\lambda_2$.

Filters 36 and 38 are integral with the splitter 34, and filter 46 is integral with the splitter 42, although for convenience they are shown as separate in FIG. 2. The head-end components 26, 32, 34, 36, 38, 40, 42 and 46 are contained together in a unitary construction 48.

The two outputs of splitter 44 feed respective electronically tunable wavelength filters or absorbers 50 and 52 designed to filter out, i.e. block, wavelengths under the control of the database 16. The filters 50 and 52 feed respective optical fibres 14A and 14B extending in opposite directions to adjacent PONs 12 on the ring, and the corresponding optical fibres 14B and 14A from those adjacent PONs are coupled to inputs of coupler 40, whose fourth input is coupled to an output of the star coupler 22 via link 18.

Each terminal 28 comprises a tunable transmitter 29 having an operating range from 1500 nm to 1530 nm and which is controllable to generate any one of 200 discrete wavelengths in that range, control circuitry (not shown) responsive to information in a receive status packet from the database to provide the appropriate control signal to the transmitter, a narrow band receiver (NBR) 31 for continuously monitoring the control channel ($\lambda_1$ to detect contention situations, and $\lambda_2$ to receive status packets), and a tunable receiver (TR) 33 controllable to receive any one of the transmission wavelengths in response to a control signal from the control circuitry.

In an alternative embodiment wherein the tunable receiver 33 is able to step from one received wavelength to another in a few nanoseconds, the separate narrowband receiver 31 is omitted and its function is provided by the tunable receiver 33.

When a terminal, say A on PON 12-1, wishes to communicate with another terminal on the ring, say A' on PON 12-1, it sends a call set-up request on wavelength $\lambda_1$ to the database 16. This request is short, less than $1 \times 10^{-4}$ sec, and comprises address fields for the source and destination terminals, and corresponding fields for the transmission wavelengths to be used by the terminals, which latter fields are initially empty.

The call set-up request travels via coupler 26, splitter 34, and filter 36 to star coupler 22, and thence to database 16 and all other terminals. Each terminal operates a contention protocol so that if another terminal wishes to send a call set-up request to the database, it will wait until completion of the current call set-up request. However, if that other terminal has already sent its own call set-up request, the terminals and the database can detect that two (or more) requests are present on the network ac the same time. The database will ignore overlapping requests, and the terminals will repeat their requests after respective random delays in accordance with the contention protocol, as is known in the art.

Upon receipt of a request, the database 16 will allocate a pair of wavelengths, $\lambda_3$ and $\lambda_4$, making an entry that these wavelengths have been allocated for communication between the two terminals. The same pair of wavelengths can be used for further calls provided that their transmission paths are kept separate so that there is no overlapping portion.

The database 16 will enter the identities of $\lambda_3$ and $\lambda_4$ in the fields of the call set-up request and transmit the modified request to the star coupler 22 at wavelength $\lambda_2$. Thus source terminal A will know that it is to transmit at $\lambda_3$, and destination terminal A' will know that it is to transmit at $\lambda_4$.

The database 16 keeps a record of the current usage of all wavelengths, other than the pair used for the control and status packets, for each of the PONs of the network. Thus for a proposed call between PON 1 and PON 3, the database will check whether for the first pair of transmission wavelengths, say $\lambda_3$ and $\lambda_4$, there is a set "use" flag for $\lambda_3$ in any of the locations $L_{3-1}$ to $L_{3-3}$ corresponding to PONs 1 to 3 and $\lambda_3$. If there is no such flag, the database will allocate that pair, setting the flag in location $L_{3-1}$ and in location $L_{4-3}$.

If any of the locations $L_{3-1}$ to $L_{3-3}$ had contained a set flag, the database would have proceeded to perform the same check for the next pair, and so on.

In the general case, where a call is being set up between terminals on PONs a and b, a being lower in numerical value than b, the database will determine the shortest route between PON a to PON b so as to maximise re-use of $\lambda_3$ and $\lambda_4$ for other potential calls on the network. For a small network of PONs in a ring with no additional links between non-adjacent PONs, this will be a simple matter of comparing the values of (b−a) and (a+N−b), where N is the number of PONs in the ring, to determine whether the shorter path is via PON a+1 etc, or via PON b+1 etc. For example, a call between PONs 3 and 8, the first value will be 5, and the second value will be 3. Therefore, the shorter route will be via PONs 1 and 2, (treating PON 1 as PON (8+1).

When a call is established, the database will set the use flag for every PON through which the optical signals pass. Thus for a call between PONs 3 and 8 via PONs 1 and 2, all those PONs will have their flags set so as to prevent the allocation of $\lambda_3$ and $\lambda_4$ for any further call involving any of those PONs. If there is an additional link between PONs 3 and 8 then only these two PONs will have their flags set. It is only necessary to have one use flag for the pair of wavelengths, but, if desired, there can be respective use flags for $\lambda_3$ and $\lambda_4$.

For "local" calls, i.e. between two terminals on network 10, wavelengths in the window 1500 nm to 1530 nm are used. With a spacing of 0.15 nm, 200 wavelengths are available which are grouped in pairs, say $\lambda_1$ $\lambda_2$, $\lambda_3$ $\lambda_4$, up to $\lambda_{199}$ $\lambda_{200}$.

A transmission protocol is used which provides that the lower of an allocated pair of wavelengths will be transmitted around the ring in the direction from the lower network address terminal to the higher network address terminal, in number order, i.e. clockwise from PON 12-1 to PON 12-2, as seen in FIG. 1, but not from PON 12-1 to PON 12-8, and correspondingly in the opposite direction for the other wavelength of the pair. Thus for a call between a terminal on PON 12-1 to a terminal on PON 12-8, the database will allocate the lower wavelength to the terminal on PON 12-8.

The protocol thus determines that all filters 52 can permanently filter out the wavelengths $\lambda_3$, $\lambda_5$, $\lambda_7$ etc, and all filters 50 can permanently filter out the wavelengths $\lambda_4$, $\lambda_6$, $\lambda_8$ etc. Thus when a terminal transmits onto the ring, the optical signals can proceed only in one direction, that direction depending on which wavelength of the pair is being used.

The database, which constitutes a connection control means of the present invention, will send a controlling signal to the relevant filter 50 or 52 at the PON having the destination terminal to filter out the transmitted wavelength and thus confine the wavelength to that transmission path between the communicating terminals.

Where communicating terminals are on the same PON, as are terminals A and A', filter 50 at that PON is controlled to filter out $\lambda_3$ and filter 52 is controlled to filter out $\lambda_4$, thus confining those wavelengths to that PON.

In this embodiment, a pair comprises neighbouring wavelengths of the group of 200 wavelengths, so that filters 50 are tunable to filter selectively the wavelengths $\lambda_3$, $\lambda_5$ etc, and correspondingly for filters 52. Thus adjacent selectable wavelengths to be filtered are spaced by 0.30 nm.

In an alternative embodiment where technology permits the selectable wavelengths to be spaced by 0.15 nm, the protocol is modified such that instead of the wavelengths for call set-up being $\lambda_1$ and $\lambda_2$, and call pairs being $\lambda_3$ and $\lambda_4$, etc. the call set-up pair comprises $\lambda_1$ and $\lambda_{101}$, and the call pairs are $\lambda_2$ and $\lambda_{102}$, $\lambda_3$ and $\lambda_{103}$, etc. This means that filter 50 is controlled to select $\lambda_2$ to $\lambda_{100}$ and is designed permanently to filter out $\lambda_{101}$ to $\lambda_{200}$, and filter 52 correspondingly is controlled to select $\lambda_{102}$ to $\lambda_{200}$ and is designed permanently to filter out $\lambda_2$ to $\lambda_{100}$. By this means, where a terminal on PON 12-1 communicates with a terminal on PON 12-2, the terminal with the lower network address will know that it has to transmit on the lower of the two allocated wavelengths $\lambda_x$ and receive one the higher, $\lambda_{100+x}$, and correspondingly for the other terminal. The database can effectively provide the identities of the two transmission wavelengths by giving the identity of one wavelength, say $\lambda_x$, together with an indication of whether the lower addressed terminal will transmit on the lower wavelength (a Normal flag set, or, where the call involves the link between PON 12-1 and PON 12-8 (i.e. the highest numbered PON), the higher addressed terminal will transmit an the lower wavelength (the Normal flag not set). in another embodiment, filters 50 and 52 filter out $\lambda_1$ , and $\lambda_{101}$, respectively, either permanently or under control of the database, and filter 46 is omitted.

In FIG. 1, by appropriate control of the filters 50 and 52 of the relevant terminals, independent calls exist at $\lambda_3$ and $\lambda_4$ for pairs of terminals BB', CC', and DD'. However, for the call between terminal E on PON 12-2 and terminal E' on PON 12-1 the database will have allocated a different pair of wavelengths $\lambda_5$ and $\lambda_6$. For the call between terminal E on PON 12-2 and terminal E' on PON 12-1, filter 52 of PON 12-1 is con-rolled to filter out $\lambda_6$ (it permanently filters out $\lambda_6$), filter 50 of PON 12-1 permanently filters out $\lambda_6$, filter 52 of PON 12-2 permanently filters out $\lambda_5$, and filter 50 of PON 12-2 is controlled to filter out $\lambda_5$ (it permanently filters out $\lambda_6$. This confines the wavelengths to the selected transmission path between the terminals including the optical links between adjacent PONs. It will be appreciated that only two tunable filters need to be controlled by the database, one for each direction of transmission so as to stop the transmitted signal from passing beyond the destination PON.

For the call between terminal D on PON 12-5 and terminal D' on PON 12-2, only filter 50 of PON 12-5 is controlled by the database 16 to filter out $\lambda_3$ and prevent that wavelength from reaching PON 12-6, and only filter 52 of PON 12-2 is controlled by the database 16 to filter out $\lambda_4$ and prevent that wavelength from reaching PON 12-1. All filters 50 permanently filter out $\lambda_4$ and all filters 52 permanently filter out $\lambda_3$.

Figure 3:
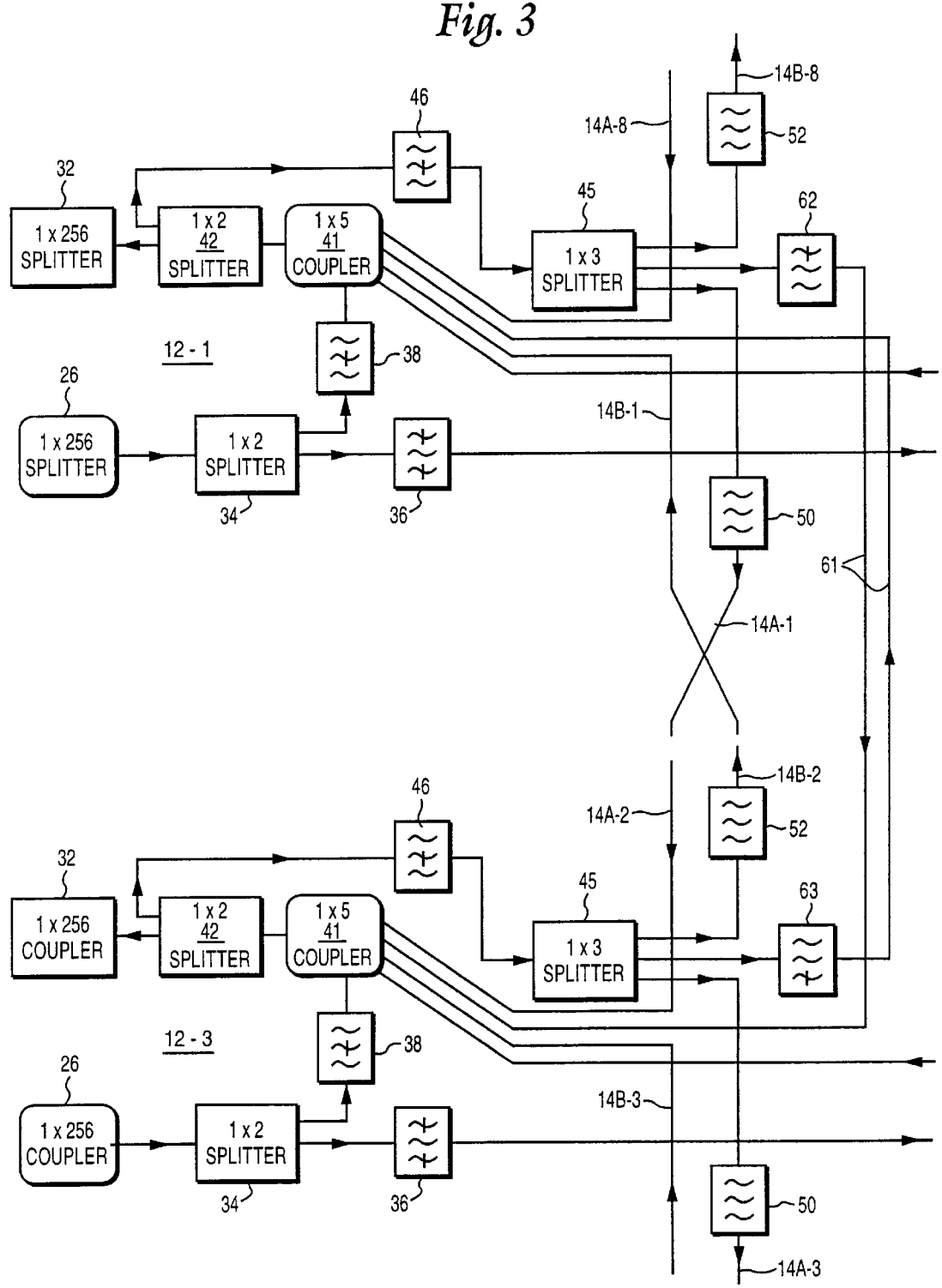
FIG. 3 is a schematic diagram of a modified part of the network of FIG. 1.

If there is a large amount of traffic between, for example, terminals on PON 12-1 and terminals on PON 12-3 and all available wavelengths are in use, the terminals on PON 12-2 cannot make any calls, but terminals on PONs 12-4 to 12-8 can communicate between themselves because wavelengths can be reused over non-lapping paths. Where such a situation is identified an additional pair of fibres 61 is connected between PONs 12-1 and 12-3 as shown in FIG. 3 in which splitter 44 is replaced by a 1×3 splitter 45, and coupler 40 is replaced by a 1×5 coupler 41, then splitter 45 of PON 12-1 is coupled by an optical fibre to coupler 41 of PON 12-3 via a filter 62, and splitter 45 of PON 12-3 is similarly coupled to coupler 41 of PON 12-1 via a filter 63.

If a terminal on PON 12-1 is communicating at $\lambda_7$ via fibres 61 with a terminal transmitting at $\lambda_8$ on PON 12-3, then in this case filters 50 of PONs 12-1 and 12-3 are controlled to filter out $\lambda_7$, filters 52 of PONs 12-1 and 1 2-3 are controlled to filter out $\lambda_8$. Filter 63 of PON 12-3 filters out $\lambda_7$ (and all lower wavelengths of pairs to be used for communication between PONs 12-1 and 12-3) and filter 62 of PON 12-1 filters out $\lambda_8$ (and corresponding all upper wavelengths). Where communication via fibres 61 is in the range 1500 nm to 1530 nm, terminals on PON 12-2 can communicate between themselves at the same wavelengths but transmission would not be permitted to pass out of PON 12-2 and interfere with reception at PONs 12-1 and 12-3.

Alternatively, this direct communication between PONs 12-1 and 12-3 is in a separate window say 1530 nm to 1565 nm. For such an arrangement it will be appreciated that an additional filter 63 will be associated with filter 50 of PONs 12-1 and 12-3 to filter out the lower wavelengths, and an additional filter 62 will be associated with filters 52 of PONs 12-1 and 12-3 to filter out the upper wavelengths.

Considering now a full-size ring of 31 PONs, one way of overcoming the transmission loss through the PONs would be to have optical amplifiers spaced around the ring at, for example, the links between PONs 3 and 4, 7, and 8, 11 and 12, 16 and 17, 21 and 22, 26 and 27, 30 and 31.

The number of optical amplifiers required around the ring is dependent upon the gain of each amplifier and the loss through the PONs. The greater the optical gain, the more PONs between amplifiers. If desired, a larger number of lower gain amplifiers can be arranged around the ring.

Figure 4:
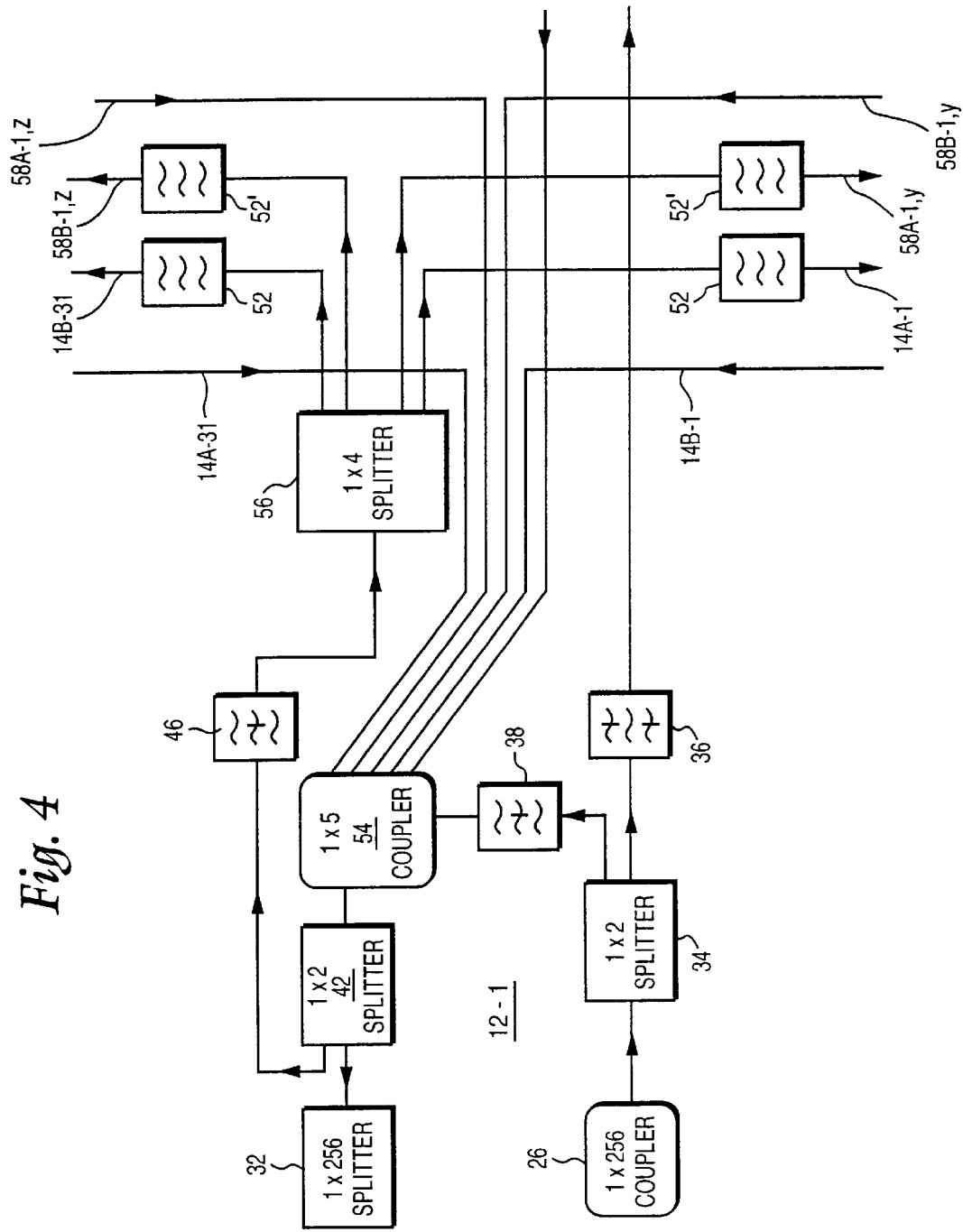
FIG. 4 is a schematic diagram of another modified pert of the network of FIG. 1.

In alternative embodiments, additional optical links 58 (see FIG. 4) are provided between non-adjacent PONs. Where a PON terminates a single additional link then it will have components as shown in FIG. 3, link 61 being equivalent to a link 58, and where it terminates two additional links it will have the components as shown in FIG. 4 which differ from the FIG. 3 arrangement in that coupler 41 has been replaced by a 1×5 coupler 54, splitter 45 has been replaced by a 1×4 splitter 56, link 58A-1 feeds the signal from one of the outputs of splitter 56 via a tunable filter 50' to the coupler 54 of a non-adjacent PON y, link 58B-1 receives the signal from a tunable filter 52' of PON y, and, correspondingly, link 58A-z carries the signal from splitter 56 via filter 52' to PON z, and link 588-z feeds the signal from filter 50' of PON z to coupler 54. In such a network, all filters 50 and 50' are identical, and all filters 52 and 52' are identical.

In alternative embodiments, the filters 50' and 52' are replaced by filters in which each wavelength is selectively absorbed or passed instead of, as in filters 50 and 52, one wavelength of each pair being permanently absorbed.

Figure 5:
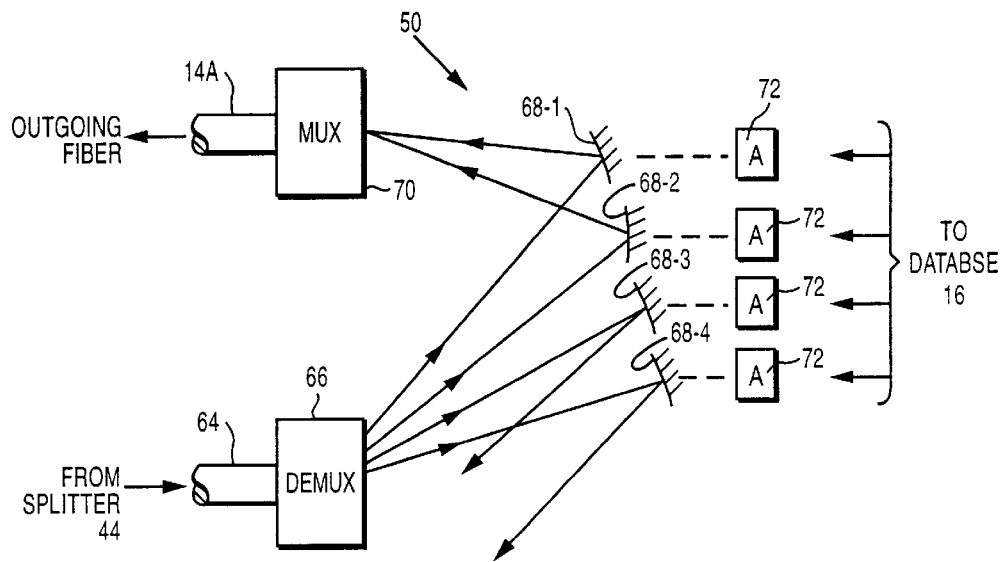
FIG. 5 is a schematic diagram of one embodiment of an electronically tunable wavelength filter for use in a network of the present invention.

Referring now to FIG. 5, which shows an electronically tunable wavelength filter 50 fabricated using bulk optics, there is shown an incoming optical fibre 64 (from splitter 44) optically coupled to a demultiplexer 66 (in the form of a Fabry Perot device) which disperses the input wavelengths such that each wavelength emerges from the demultiplexer 66 at a respective angle. Disposed in the path of the emergent wavelengths are respective movable mirrors 68-1 to 68-N (only four being shown), where N may be 200.

Each of the mirrors 68 is movable between a first stable position in which it reflects its input wavelength towards a multiplexer 70, which is optically coupled to the outgoing optical fibre 14A, and a second stable position in which it reflects its input wavelength away from the multiplexer 70. Each mirror has an associated actuator (A) 72 which drives the mirror into the first position in response to an electrical signal representative of a logic one condition (On), and into the second position for a logic zero condition (Off).

The database 16 controls the filters 50 and 52 by sending logic signals to the respective actuators 72 to control which wavelengths are absorbed and which are not.

The filter proper may comprise a number of sections (not shown) each arranged to handle a respective group of the wavelengths used in the network, and in this case the sections will be coupled to the fibres 64 and 14A by respective splitters (not shown) and couplers (not shown).

In the filter of FIG. 5 all the mirrors are tunable. In a variant for use with a network in which one wavelength of each pair is permanently absorbed, there is no need to provide any mirrors for these filtered wavelengths because they can be absorbed in any suitable manner.

Figure 6:
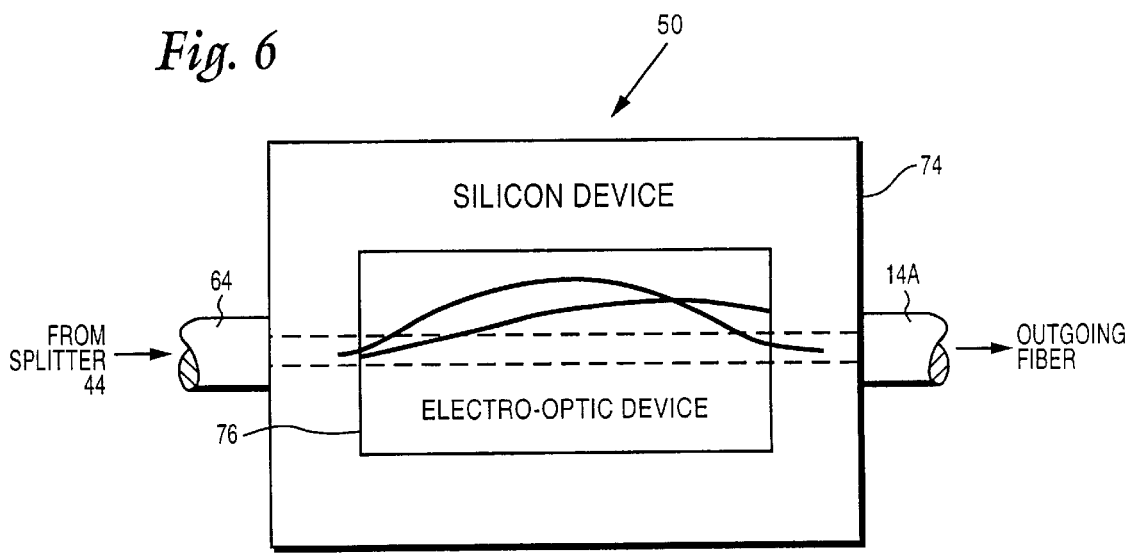
FIG. 6 is a schematic diagram of a part of an alternative embodiment of the filter of FIG. 5.

In FIGS. 6, which shows one component of an alternative fabrication of the filter 50 using integrated optics, the fibre 64 is coupled (via a splitter, not shown) to the input of a silicon device 74 and the fibre 14A is coupled (via a coupler, not shown) to the output of the device 74. A central portion of device 74 comprises an electro-optical device 76 whose refractive index varies with an applied electrical signal. An InP-doped optical transmission path exists from the input of device 74, through the electro-optical device 76, to the output of device 74. Device 76 responds to an actuating electrical signal from database 16 to alter its value of refractive index and cause the wavelengths to follow respective curved paths from the input of device 76 to its output region, only one wavelength passing out of device 76, and out of device 74, while all other wavelengths are absorbed by device 76. In this case the actuating signal will be analogue in nature as opposed to the digital control required for the embodiment of FIG. 5.

It will be understood that the more additional links that a network has, ranging from links which by-pass one PON up to links which by-pass many PONs (say, thirteen or even fifteen), the greater the likelihood of there being a low-hop path between a source and a destination PON. On the other hand, as the number of outputs increases on the output splitter (45, 56) there will be increased signal loss through a PON.

Where network 10 is an access network of a national communications network, there will be links from network 10 to the next hierarchical level, say the core network of the national network, and optical communication on such links will be in the window 1530 nm to 1565 nm and employ erbium doped fibre amplifiers (EDFAs) to compensate for loss of signal strength over the long run from the network 10 to its nearest core-network switching node. In such a case, any communication over links 61 should not be in the EDFA window to keep this free for calls via the core network.

In greater detail, a call set-up request, also called a control packet, comprises four fields, the first contains the identity (address) of the destination terminal or node (26 bits), the second contains the bandwidth requested by the source terminal for the transmission (8 bits), the third contains the identity (address) of the source terminal or node (26 bits) and the fourth contains error checking or correction information and the time that the request was sent (40 bits). At a data transmission rate of about 2M bit/s this would be transmitted and received at the database in less than $10^{-4}$ s.

If the database receives a call set-up request which is not corrupted by, for example, interference from another request, it transmits a modified request, also called a status packet, comprising four fields, the first containing the address of the destination terminal, the second containing the address of the source terminal, the third containing error checking or correction information, and the fourth containing the identities of the respective wavelengths to be used for the information transfer phase (ITP), and the time that the status packet was sent.

If for some reason, for example the destination terminal is already engaged in a call with another terminal, the database knows that the destination terminal is not free to accept a call request, it sends a status packet at 12 with the address of the source terminal in the first field. The source terminal will recognise that its own address is in both the source and destination fields and know that the database cannot send a status packet to the destination terminal at that time. With a sophisticated calling procedure the status packet could be sent to a busy destination terminal to generate, for example, a call waiting signal.

When the ITP has finished the source terminal will send a call shut-down request or packet to the database which responds by altering the entries in its records to the effect that the terminals are now free and not busy, that the two allocated wavelengths are available for use over any path not already in use at those wavelengths, and that all the tunable wavelength filters which had been under the control of the database to filter out one or other or both of the wavelengths for the call just finished can now be controlled to pass those wavelengths if required.

The pairs of optical links 14 of network 10 are formed of monomode fibre without EDFA, so for a call from network 10 via the core network, wavelengths will be chosen within the EDFA window of 1530 nm to 1565 nm, but local calls, i.e. those not involving the core network, use wavelengths outside this region.

Customers making local calls are allocated basic 2.048 Mbit/s channels at wavelengths less that 1530 nm, and channels at about 10M bit/s at wavelengths greater than 1565 nm.

In the above described embodiments, filters 50 and 52 on an optical link between adjacent PONs have been disposed at the transmitter end of the optical link. If desired, they could be disposed at the receiver end of the links, or at any convenient position along the links.

Instead of network 10 being serially connected in a ring as in FIG. 1, it could be a fully or partially connected mesh network, in which case the filters should be fully tunable so that any of the possible paths between a source PON and a destination PON can be chosen, or it could be a bus network, which is effectively a broken ring.

In a variant the database allocates a single wavelength for communication between a source terminal, i.e. a terminal which requests a connection, and a destination terminal, and the source terminal employs a ranging and synchronisation protocol for establishing a two time slot time division multiplex communication between the terminals. The protocol would ensure that the receiver of the source terminal is inhibited during transmission from the source transmitter and at least until reception of the reflection of the source terminal transmission from the destination PON. In order for the destination terminal to use the same wavelength, filters 52 of the destination PON and any intermediate PONS are not controlled to block the wavelength transmitted from the source terminal, whereby the same wavelength transmitted from the destination terminal will pass through filters 52 and reach the source terminal.

In another variant one or more links incorporate a respective wavelength translator. The amount by which a translator shifts received wavelengths may be fixed or be controlled by the database. Translators may be used where it is desired to use a particular wavelength or wavelengths for a new call, but there will be wavelength contention or conflict on the transmission path for the new call, For example, there may be an existing conference call between many terminals using the particular wavelength(s) and a new terminal is to be added to the conference without changing the wavelength (s). The newly added terminal can be controlled by the database to use the shifted wavelength(s), or the wavelengths shifted back by a further translators after the signal has passed the wavelength contention part of the transmission path.

Whereas all the abovementioned links are optical fibre links, a network may include links between PONs which comprise non-optical paths and appropriate converters, for example a radio or satellite link.

Whereas the abovedescribed specific embodiment and variants relate to a telecommunications network in which the terminals are telephones, facsimile machines and the like, it will be appreciated that the network of the present invention is equally applicable for the transport of data between elements of data processing apparatus and the like where, for example, such elements are in the form of, for example, individual cards comprising respective electro-optical interfaces (optical transmitters and receivers) each constituting a terminal of the present invention. A plurality of the cards, say those of a shelf, can be grouped on a single PON, a plurality of such PONs in a large apparatus comprising several shelves being inter-connected four connections between any two terminals of the apparatus. Such an arrangement may be used in computing apparatus, database handling apparatus, and any apparatus where an optical interface (i.e. terminal) requires selective connection to another terminal, the nature of the information to be transmitted on the network being immaterial.

We claim:

1. An optical communications network comprising:

a plurality of optically inter-connected passive optical networks (PONs) employing wavelength division multiplexing for communications between source and destination terminals that are, in turn each coupled optically to an associated PON, and wherein first and second wavelengths are respectively allocated to the source and destination terminals on respective PONs for a call, each PON having a coupling means arranged to couple input signals to a downstream outgoing path to its respective terminals and to each optical link outgoing to another of the PONs, the coupling means having inputs from an upstream incoming path from its respective terminals and from each optical link incoming from another PON, the communications network including a wavelength filter means associated with each of said incoming and outgoing optical links between PONs, and means for controlling at least some of the respective filter means such that a first wavelength allocated for transmission from a first of said PONs to a second of said PONs is filtered/blocked on each said optical link leading from said second PON to a corresponding neighbouring PON and on each said optical link from said first PON and any intermediate PON between said first PON and said second PON, other than an optical link constituting a part of the transmission path leading from said first PON to said second PON, thus permitting the concurrent use of the same wavelengths for another call over a non-overlapping transmission path elsewhere in the network.

2. A network as in claim 1, wherein the controlling means is arranged (a) to allocate first and second wavelengths respectively to source and destination terminals on respective PONs for a call, (b) to control the filter means associated with each outgoing link not forming part of a path between the source and destination PONs to block the first and the second wavelengths, (c) to control the filter means associated with each link from the source PON to the destination PON, via any intermediate PONs, to block the second wavelength, and (d) to control the filter means associated with each link from the destination PON to the source PON, via any intermediate PONs, to block the first wavelength.

3. A network as in claim 1, wherein:

the PONs are linked serially in address order, each having an outgoing optical link to each neighbouring PON, the filter means associated with links in the direction of increasing PON address order being arranged to permanently block wavelengths allocated by the controlling means to terminals for transmission to PONs of lower address, and the filter means associated with links in the direction of decreasing PON address being arranged to permanently block wavelengths allocated to terminals for transmission to PONs of higher address whereby only the controllable filter means associated with the outgoing links of the respective destination PONs to neighbouring PONs not associated with that call are controlled to filter out the respective wavelength.

4. A network as in claim 3, wherein the controlling means is arranged to allocate for transmission in one direction wavelengths which are spaced and alternate with wavelengths allocated for transmission in the other direction.

5. A network as in claim 3, wherein the controlling means is arranged to allocate for transmission in one direction wavelengths within a first band, and to allocate for transmission in the opposite direction wavelengths within a second band.

6. A network as in claim 5, wherein the controlling means is arranged to allocate for each call a pair of wavelengths, each pair being spaced by a constant amount.

7. An optical communications network comprising:
a plurality of optically inter-connected passive optical networks (PONs) in which multicast communication between terminals to all neighbouring PONs is by wavelength division multiplexing, means for allocating a pair of wavelengths including a first wavelength for a call over a unidirectional linked transmission path required from a source terminal connected to a source PON and a destination terminal connected to a destination PON, and means for controllably blocking said first allocated wavelength on each outgoing link from the destination PON to a neighbouring PON, and on each outgoing link from the source PON, and from intermediate PONs, other than a link forming a part of the transmission path from the source PON to the destination PON, whereby the same pair of wavelengths can be concurrently allocated for another call which does not have an overlapping transmission path in the network.

8. A method of communicating between terminals on an optical communications network employing wavelength division multiplexing and comprising a plurality of optically inter-connected passive optical networks (PONs), the method comprising the steps of:
allocating first and second predetermined transmission wavelengths to a source terminal and a destination terminal of source and destination PONs, respectively, for a first call, and filtering out these first and second wavelengths on optical links between selected PONs such that the transmissions for said first call are confined to the PON or PONs having the source and destination terminals, and to any optical links therebetween, via any intermediate PONs, whereby the first wavelength allocated for transmission from a first of said PONs to a second of said PONs is filtered/blocked on each said optical link leading from said second PON to a corresponding neighbouring PON and on each said optical link from said first PON and any intermediate PON between said first PON and said second PON, other than an optical link constituting a part of the transmission path leading from said first PON to said second PON, thus enabling the first and second wavelengths to be used for a simultaneous call over a non-overlapping transmission path in the network.

9. A method as in claim 8, where the PONs are linked serially in address order, and said method further including:
permanently filtering out the first predetermined wavelength on each optical link leading from a PON to a PON of lower address, permanently filtering out the second predetermined wavelength on each optical link leading from a PON to a PON of higher address, selectively filtering out the first predetermined wavelength on the optical link leading from the destination PON to a PON of higher address, and selectively filtering out the second predetermined wavelength on the optical link leading from the source PON to a PON of lower address.

10. A method as in claim 8, including the step of allocating each further call having a transmission path overlapping that of the first call a respective different pair of predetermined wavelengths.

11. A method as in claim 10, including the step of spacing the lower wavelengths of the pairs by a predetermined difference, and correspondingly spacing the upper wavelengths of the pairs by the same predetermined difference.

12. A method as in claim 10, wherein each pair comprises adjacent wavelengths.

13. A method as in claim 10, including grouping all the lower wavelengths of the pairs in one group in wavelength order, and grouping all the upper wavelengths of the pairs in an adjacent group.

14. An optical communications network comprising:
a plurality of passive optical networks (PONs), each having an optical signal coupling means having a plurality of inputs and a plurality of outputs, and a respective plurality of terminals each having a tunable transmitter and a tunable receiver, the transmitters being coupled to respective ones of said plurality of inputs, and the receivers being coupled to respective ones of said plurality of outputs;

for each of said PONs, the respective coupling means having a respective pair of its inputs and outputs coupled by respective optical links to a respective pair of inputs and outputs of the coupling means of at least one other of said PONs, each of said optical links comprising a respective selectively tunable wavelength blocker having a control port, an optical input-coupled to the output of one of said respective pairs, and an optical output coupled to the input of the other of said respective pairs; and a connection controller coupled to the control ports of each of said selectively tunable wavelength blockers and arranged to determine a first signal transmission path for a first communications channel from the transmitter of a source terminal of a first of said PONs to the receiver of a destination terminal of a second of said PONs, to allocate dynamically a first wavelength for signals of said first communications channel, and to send appropriate control signals (a) to the control ports of the selectively tunable wavelength blockers of the optical links associated with outputs of the coupling means of said first PON such that signals at said first wavelength are permitted on the optical link forming said first signal transmission path, or part thereof, and are blocked on any other optical link associated with an output of said coupling means of said first PON, (b) to the control ports of the selectively tunable wavelength blockers of the optical links associated with outputs of the coupling means of said second PON such that signals at said first wavelength are blocked on all of the optical links associated with outputs of said coupling means of said second PON, and, (c) to the control ports of the selectively tunable wavelength blockers of the optical links associated with outputs of the coupling means of any intermediate PON such that signals at said first wavelength are permitted on the optical link forming part of said first signal transmission path and are blocked on any other optical link associated with an output of said coupling means of any intermediate PON, the connection controller being coupled to the PONs and being arranged to send corresponding control signals to enable said source and destination terminals to tune their respective tunable transmitter and tunable receiver to said first wavelength.

15. A network as claimed in claim 14 wherein said connection controller is arranged to determine, for a second communications channel from the transmitter of said destination terminal to the receiver of said source terminal, a second signal transmission path, and to allocate dynamically a second wavelength for signals of said second communications channel, and to send appropriate control signals (a) to the control ports of the selectively tunable wavelength blockers of the optical links associated with outputs of the coupling means of said second PON such that signals at said second wavelength are permitted on the optical link forming said second signal transmission path, or part thereof, and are blocked on any other optical link associated with an output of said coupling means of said second PON, (b) to the control ports of the selectively tunable wavelength blockers of the optical links associated with outputs of the coupling means of said first PON such that signals at said first wavelength are blocked on all of the optical links associated with outputs of said coupling means of said first PON, and (c) to the control ports of the selectively tunable wavelength blockers of the optical links associated with outputs of the coupling means of any intermediate PON such that signals at said second wavelength are permitted on the optical link forming part of said second signal transmission path and are blocked on any other optical link associated with an output of said coupling means of any intermediate PON, the connection controller being arranged to send corresponding control signals to enable said destination and source terminals to tune their respective tunable transmitter and tunable receiver to said second wavelength.

16. An optical communications network comprising:

a plurality of passive optical networks (PONs), each having a unique network address, an optical signal coupling means having a plurality of inputs and a plurality of outputs, and a respective plurality of terminals each having a tunable transmitter and a tunable receiver, the transmitters being coupled to respective ones of said plurality of inputs, and the receivers being coupled to respective ones of said plurality of outputs;

for each of said PONs, the respective coupling means having a respective pair of its inputs and outputs coupled by respective optical links to a respective pair of the inputs and outputs of the coupling means of at least one other of said PONs such that the PONs are serially linked in address order, each of said optical links comprising a respective selectively tunable wavelength blocker having a control port, an optical input coupled to the output of one of said respective pairs, and an optical output coupled to the input of the other of said respective pairs, said selectively tunable wavelength blockers being arranged to block permanently a first common set of wavelengths on each optical link outgoing from a PON to a PON of lower address; and a connection controller coupled to the control ports of each of said selectively tunable wavelength blockers and arranged to determine a first signal transmission path for a first communications channel from the transmitter of a source terminal of a first of said PONs to the receiver of a destination terminal of a second of said PONs, said second PON having a higher address than said first PON, to select dynamically from said first set of wavelengths a first wavelength for signals of said first communications channel, and to send an appropriate control signal to the control port of the selectively tunable wavelength blocker of the optical link associated with the output of the coupling means of said second PON outgoing to its adjacent PON of higher address such that signals at said first wavelength are blocked on the optical link to said adjacent PON, the connection controller being coupled to the PONs and being arranged to send corresponding control signals to enable said source and destination terminals to tune their respective tunable transmitter and tunable receiver to said first wavelength.

17. A network as in claim 16, wherein:

said selectively tunable wavelength blockers are also arranged to permanently block a different second common set of wavelengths on each optical link outgoing from a PON to a PON of higher address;

the connection controller is arranged to determine a second signal transmission path for a second communications channel from the transmitter of said destination terminal to the receiver of said source terminal, to select dynamically from said second set of wavelengths a second wavelength for signals of said second communications channel, and to send an appropriate control signal to the control port of the selectively tunable wavelength blocker of the optical link associated with the output of the coupling means of said first PON outgoing to its adjacent PON of lower address such that signals at said second wavelength are blocked on the optical link to said adjacent PON of lower address, and the connection controller being arranged to send corresponding control signals to enable said destination and source terminals to tune their respective tunable transmitter and tunable receiver to said second wavelength.

18. A network as in claim 17, wherein the wavelengths of said first set are spaced and alternate with wavelengths of said second set.

19. A network as in claim 17 wherein the wavelengths of said first set are within a first band, and the wavelengths of said second set are within a second band.

20. A network as in claim 19 wherein the connection controller is arranged to select the respective first and second wavelengths of each pair of connection channels such that the wavelengths of each such pair are spaced by a constant amount.

21. A method of establishing communication between terminals on an optical communications network comprising a plurality of optically linked passive optical networks (PONs) in which communication channels between terminals are wavelength multiplexed and the PONs are arranged to relay an incoming optical signal to each of a plurality of outgoing optical links the method comprising the steps of:

determining a first transmission path for a first communication channel from a source terminal of a first of said PONs to a destination terminal of a second of said PONs, dynamically allocating a first wavelength for signals of said first connection channel, and dynamically controlling respective selectively tunable wavelength blockers of optical links associated with said first and second PONs, and with any intermediate PONs, such that signals at said first wavelength are permitted on optical links of said first transmission path and blocked on all other optical links outgoing from the relevant PONs.

22. A method as in claim 21 including the steps of:

determining for a second communications channel from the transmitter of said destination terminal to the receiver of said source terminal a second transmission path, dynamically allocating for said second connection channel a second wavelength, and dynamically controlling respective selectively tunable wavelength blockers of optical links associated with said first and second PONs, and with any intermediate PONs, such that signals at said second wavelength are permitted on optical links of said second transmission path and blocked on all other optical links outgoing from the relevant PONs.

23. A method of establishing communication between terminals on an optical communications network comprising a plurality of optically linked passive optical networks (PONs) in which communication channels between terminals are wavelength multiplexed, the PONs having respective unique addresses, being arranged serially in address order and being arranged to relay an incoming optical signal to each of one or more outgoing optical links each having a respective selectively tunable wavelength blocker, the selectively tunable wavelength blockers being arranged to permanently block a first common set of wavelengths on each optical link outgoing from a PON to a PON of lower address; the method comprising the steps of:

determining a first transmission path for a first communication channel from a source terminal of a first of said PONs to a destination terminal of a second of said PONs, said second PON having a higher address than said first PON, dynamically selecting from said first set of wavelengths a first wavelength for signals of said first connection channel, and dynamically controlling a respective selectively tunable wavelength blocker of the optical link from said second PON to its higher addressed adjacent PON such that signals at said first wavelength are blocked on said optical link from said second PON to its higher addressed adjacent PON.

24. A method as in claim 23, wherein the selectively tunable wavelength blockers are arranged to block permanently a different second common set of wavelengths on each optical link outgoing from a PON to a PON of higher address; the method further comprising the steps of:

determining a second transmission path for a second communication channel from said destination terminal to said source terminal, dynamically selecting from said second set of wavelengths a second wavelength for signals of said second connection channel, and dynamically controlling a respective selectively tunable wavelength blocker of the optical link from said firs PON to its lower addressed adjacent PON such that signals at said second wavelength are blocked on said optical link from said first PON to its lower addressed adjacent PON.

25. A method as in claim 24 wherein each further pair of connection channels having a transmission path overlapping that of the first pair of connection channels is allocated a respective different pair of transmission wavelengths, and including the step of:

spacing the lower wavelengths of the pairs by a predetermined difference, and correspondingly spacing the upper wavelengths of the pairs by the same predetermined difference.

26. A method as in claim 25 wherein each pair comprises adjacent wavelengths.

27. A method as in claim 25 including grouping all the lower wavelengths of the pairs in one group in wavelength order, and grouping all the upper wavelengths of the pairs in an adjacent group.

28. An optical communications network comprising:

a plurality of optical sub-networks optically interlinked via selective wavelength blocking optical filters, at least some of said filters being separately controllable to block selected optical frequencies; and a wavelength allocation data base connected to control said controllable filters so as to permit concurrent use of the same optical wavelengths in different portions of said network.

29. A method for communicating within an optical communications network having a plurality of sub-networks optically interlinked via selective wavelength blocking optical filters, at least some of said filters being separately controllable to block selected optical frequencies, said method comprising the steps of:

controlling at least some of said controllable filters to permit a first communication using at least a first optical wavelength in a first portion of the network; and controlling at least some of said controllable filters to permit a concurrent second communication also using said at least a first optical wavelength in a second portion of the network that does not overlap said first portion.

30. An optical communications network comprising: a plurality of passive optical network (PONs) each having a plurality of optical terminals, and connection control means for dynamically allocating a first wavelength for a wavelength multiplexed communication channel connection from a first of the optical terminals to a second of the optical terminals and for commanding a transmitter of said first optical terminal and a receiver of said second terminal to tune to said first wavelength; the network being characterised in that:

at least some of the PONs are directly connected to a respective plurality of neighbouring ones of the PONs by respective bidirectional optical links connected to respective inputs and outputs of the PONs;

each of the optical links includes a respective selectively tunable wavelength blocker for each of the transmission directions of the link, each selectively tunable wavelength blocker being coupled to the connection control means and being responsive to a control signal from the connection control means to tune to the wavelength corresponding to the control signal and to block its transmission;

each PON is arranged to relay to its outputs optical signals received at an input and optical signals from its optical terminals;

and the connection control means determines which one or more of the selectively tunable wavelength blockers is to be commanded to block said first wavelength in order to confine said first wavelength to a transmission path from the first optical terminal to the second optical terminal, and to apply a first control signal corresponding to said first wavelength to each selectively tunable wavelength blocker so determined.

31. A network as claimed in claim 30, wherein said connection control means is arranged dynamically to allocate for a communication channel from said second optical terminal to said first optical terminal, a second wavelength for transmission from said second optical terminal to said first optical terminal via said transmission path, and further determines which one or more of the selectively tunable wavelength blockers is to be commanded to block said second wavelength in order to confine said second wavelength to said transmission path, and to apply a second control signal corresponding to said second wavelength to each selectively tunable wavelength blocker so further determined.

32. A network as claimed in claim 31, wherein the PONs are linked serially in address order, and the connection control means is arranged to apply continuously a first set of predetermined control signals to the respective selectively tunable wavelength blockers associated with transmission in the direction of increasing PON address such as to block continuously a first set of wavelengths, and arranged to apply continuously a second set of predetermined control signals to the respectively selectively tunable wavelength blockers associated with transmission in the direction of decreasing PON address such as to block continuously a second set of wavelengths, whereby only the respectively selectively tunable wavelength blocker associated with the transmission directly from a destination PON to each of its neighbouring PONs not associated with that connection is dynamically controlled to block the respective wavelength.

33. A network as claimed in claim 32, wherein the connection control means is arranged such that the wavelengths of said first set of wavelengths are spaced and alternate with the wavelengths of said second set of wavelengths.

34. A network as claimed in claim 32, wherein the connection control means is arranged such that the wavelengths of said first set of wavelengths are within a first band, and the wavelengths of said second set of wavelengths are within a second band.

35. A network as claimed in claim 34, wherein the connection control means is arranged to allocate for each connection a pair of wavelengths, each pair being spaced by a constant amount.

36. A network as claimed in claim 31, wherein the PONs are linked serially in address order; the respective selectively tunable wavelength blockers associated with transmission in the direction of increasing PON address are responsive only to control signals corresponding to wavelengths to be allocated by the connection control means to terminals for transmission to PONs of lower address and are associated with first means for permanently blocking wavelengths to be allocated by the connection control means to terminals for transmission to PONs of higher address; and the respective selectively tunable wavelength blockers associated with transmission in the direction of decreasing PON address are responsive only to control signals corresponding to wavelengths to be allocated by the connection control means to terminals for transmission to PONs of higher address and are associated with second means for permanently blocking wavelengths to be allocated by the connection control means to terminals for transmission to PONs of lower address.

37. A network as claimed in claim 36, wherein said first means for permanently blocking wavelengths is arranged to block wavelengths which are spaced and alternate with wavelengths which said second means for permanently block wavelengths is arranged to block.

38. A network as claimed in claim 36, wherein first means for permanently blocking wavelengths is arranged to block wavelengths within a first band, and said second means for permanently blocking wavelengths is arranged to block wavelengths within a second band.

39. A method of establishing communication between optical terminals of a plurality of passive optical networks (PONs), each optical terminal having a respective tunable optical transmitter and receiver for providing wavelength multiplexed communication channels between terminals, the method comprising the steps of dynamically allocating a first wavelength for transmission from a first optical terminal to a second optical terminal for a first connection, and commanding the transmitter of said first optical terminal and the receiver of said second terminal to tune to said first wavelength, and the method further comprising the prior steps of directly connecting at least some of the PONs to a respective plurality of neighbouring ones of the PONs by respective bidirectional optical links connected to respective inputs and outputs of the PONs to form a network, providing each of the optical links with a respective selectively tunable wavelength blocker for each of the transmission directions of the link, and arranging each PON to relay to each of its outputs optical signals received at an input and optical signals from the optical terminals, and further comprising the steps of determining which one or more of the selectively tunable wavelength blockers is to be commanded to block said first wavelength in order to confine said first wavelength to a transmission path from the first optical terminal to the second optical terminal, and applying a first control signal corresponding to said first wavelength to each selectively tunable wavelength blocker so determined.

40. A method as claimed in claim 39, including the steps of dynamically allocating, for said first connection, a second wavelength for transmission from the second optical terminal to the first optical terminal, and further determining which one or more of the selectively tunable wavelength blockers is to be commanded to block said second wavelength in order to confine said second wavelength to said transmission path, and applying a second control signal corresponding to said second wavelength to each selectively tunable wavelength blocker so further determined.

41. A method as claimed in claim 40 wherein the PONs are linked serially in address order, and including the steps of continuously blocking transmission from each PON to the respective neighbouring PON of lower address of one wavelength of said first and second allocated wavelengths, and continuously blocking transmission from each PON to the respective neighbouring PON of higher address of the other wavelength of said allocated wavelengths, and wherein the determining step determines, in respect of said one wavelength, the selectively tunable wavelength blocker associated with the transmission direction from the destination PON to its neighbouring PON of higher address, and, in respect of said other wavelength, the selectively tunable wavelength blocker associated with the transmission direction from the source PON to its neighbouring PON of lower address.

42. A method as claimed in claim 41, wherein said continuously blocking steps comprise continuously applying a first set of predetermined control signals to the respective selectively tunable wavelength blockers associated with transmission in the direction of increasing PON address such as to block continuously a first set of wavelengths, and continuously applying a second set of predetermined control signals to the respective selectively tunable wavelength blockers associated with transmission in the direction of decreasing PON address such as to block continuously a second set of wavelengths, said first wavelength being a member of one of said sets of wavelengths and said second wavelength being a member of the other of said sets of wavelengths.

43. A method as claimed in claim 39 including dynamically allocating each further connection having a transmission path overlapping that of the first connection a respective different pair of transmission wavelengths.

44. A method as claimed in claim 43, including spacing the lower wavelengths of the pairs by a predetermined difference, and correspondingly spacing the upper wavelengths of the pairs by the same predetermined difference.

45. A method as claimed in claim 43, wherein each pair comprises adjacent wavelengths.

46. A method as claimed in claim 43, including grouping all the lower wavelengths of the pairs in one group in wavelength order, and grouping all the upper wavelengths of the pairs in an adjacent group in wavelength order.

* * * * *